United States Patent
Wang et al.

(10) Patent No.: US 11,385,985 B2
(45) Date of Patent: Jul. 12, 2022

(54) SERVER POWER CONSUMPTION MANAGEMENT METHOD AND DEVICE

(71) Applicant: Huawei Technologies Co., Ltd., Shenzhen (CN)

(72) Inventors: Jiangtao Wang, Shenzhen (CN); Zhibing Li, Shenzhen (CN); Lang Tao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/818,765

(22) Filed: Mar. 13, 2020

(65) Prior Publication Data
US 2020/0210304 A1 Jul. 2, 2020

Related U.S. Application Data

(63) Continuation of application No. PCT/CN2018/105194, filed on Sep. 12, 2018.

(30) Foreign Application Priority Data

Sep. 14, 2017 (CN) .......................... 201710826652.4

(51) Int. Cl.
*G06F 1/30* (2006.01)
*G06F 11/30* (2006.01)

(52) U.S. Cl.
CPC ............ *G06F 11/3062* (2013.01); *G06F 1/30* (2013.01)

(58) Field of Classification Search
CPC ............................... G06F 11/3062; G06F 1/30
See application file for complete search history.

(56) References Cited

U.S. PATENT DOCUMENTS

| | | | |
|---|---|---|---|
| 2005/0172157 A1* | 8/2005 | Artman | G06F 1/32 713/300 |
| 2007/0250218 A1* | 10/2007 | Culley | G06F 1/30 700/295 |

(Continued)

FOREIGN PATENT DOCUMENTS

| | | |
|---|---|---|
| CN | 101937264 A | 1/2011 |
| CN | 102541239 A | 7/2012 |

(Continued)

*Primary Examiner* — Gary Collins
(74) *Attorney, Agent, or Firm* — Levdig, Voit & Mayer, Ltd.

(57) ABSTRACT

A power consumption management method and a power consumption management device are provided. When a power module of a power supply for a server is faulty, a power consumption management device receives fault information sent by the power supply, and reduces first power consumption, calculated when the power module works normally, of the server by a first value to second power consumption of the server based on the fault information. The first value is not less than a reduced value, calculated when the power module is faulty, of power consumption of the server. In addition, the power consumption management device adjusts the second power consumption of the server based on a power consumption capping value of the server. According to the application, a breakdown of the server is avoided, and the power utilization after the power module is faulty is further improved.

9 Claims, 5 Drawing Sheets

(56) References Cited

U.S. PATENT DOCUMENTS

| | | | | |
|---|---|---|---|---|
| 2008/0320322 A1* | 12/2008 | Green | ............... | G06F 1/3296 |
| | | | | 713/340 |
| 2012/0030493 A1* | 2/2012 | Cepulis | ............... | G06F 1/324 |
| | | | | 713/324 |
| 2015/0355699 A1* | 12/2015 | Castro-Leon | ......... | G06F 1/324 |
| | | | | 713/322 |
| 2016/0094426 A1 | 3/2016 | Myrah et al. | | |

FOREIGN PATENT DOCUMENTS

| | | |
|---|---|---|
| CN | 102916835 A | 2/2013 |
| CN | 107783882 A | 3/2018 |
| EP | 2747344 B1 | 1/2016 |

\* cited by examiner

SERVER POWER CONSUMPTION MANAGEMENT METHOD AND DEVICE

CROSS-REFERENCE TO RELATED APPLICATIONS

This application is a continuation of International Application No. PCT/CN2018/105194, filed on Sep. 12, 2018, which claims priority to Chinese Patent Application No. 201710826652.4, filed on Sep. 14, 2017. The disclosures of the aforementioned applications are hereby incorporated by reference in their entireties.

TECHNICAL FIELD

Embodiments of the present application relates to the field of information technologies, and in particular, to a server power consumption management method and a device.

BACKGROUND

A server is usually equipped with a power supply including a plurality of power modules. A power consumption capping technology can ensure that power consumption of the server is maintained in a stable level when the server is running, to improve power utilization. Users set a capping value of power consumption of the entire server, and the power consumption of the entire server is periodically checked when the server is running. If the power consumption reaches the capping value, measures, such as reducing a frequency of a central processing unit (CPU) of the server, are used to limit the power consumption of the server within an error range of 5% of target power consumption.

However, when a power module of the server is faulty, because a time for completing a power consumption capping operation is far longer than a holding time that can be used for maintaining normal work of the server when the power module is faulty, total power consumption that can be provided by the power supply is rapidly reduced to below current running power consumption of the server, leading to a breakdown of the server.

SUMMARY

According to an aspect, an embodiment provides a server power consumption management method. A power supply supplies power to a server, the power supply includes a power module, and a power consumption management device communicates with the power supply and the server. The method includes: receiving, by the power consumption management device, fault information of the power module, and reducing first power consumption of the server by a first value to obtain second power consumption of the server, where the first power consumption is a power consumption value of the server calculated when the power module works normally, and the first value is not less than a reduced value, calculated when the power module is faulty, of power consumption of the server; and adjusting, by the power consumption management device, the second power consumption of the server based on a power consumption capping value of the server, where the power consumption capping value of the server is a difference between the first power consumption and the reduced value of the power consumption of the server.

A specific implementation of reducing the power consumption of the server by the first value includes but is not limited to pulling down Prochot and Memhot pins of a CPU, turning off a component such as a clock, temporarily powering off a fan, triggering a low load or a hibernate mode of a component, or the like. After the power module is faulty, the power consumption management device reduces the power consumption of the server by the first value within a holding time to below maximum power consumption that can be provided by the power supply after the power module is faulty. This ensures that the server does not break down. A power consumption capping technology can precisely adjust the power consumption of the server. The power consumption management device periodically detects the power consumption of the server, and calculates a difference between the power consumption of the server and the power consumption capping value of the server. When the difference is greater than a preset error value, a power control device adjusts the power consumption of the server, continues to detect the power consumption, and calculates the difference until the difference falls within a preset error range. A specific implementation of the power consumption adjustment is mainly adjustment of a running state of a high-power component, including but not limited to CPU frequency and voltage adjustment, CPU core enabling and disabling, a CPU P/T-state, a memory frequency, a T state of a memory, reading, writing, and hibernation states of a hard disk, an L0/L1 pin state of a high-speed peripheral component interconnect express (PCIe) network adapter, a working status of a graphics processing unit (GPU), a fan speed, and other manners in which precise control on the power consumption of the server can be implemented. This method avoids a breakdown of the server, and further improves power utilization after the power module is faulty.

With reference to a first aspect, in a first possible implementation of the first aspect, the server includes a plurality of nodes. The reducing, by the power consumption management device, first power consumption of the server by a first value to obtain second power consumption of the server specifically includes: obtaining, by the power consumption management device, a reduced value of power consumption of each node; and reducing, by the power consumption management device, the power consumption of each node by a second value based on the reduced value of the power consumption of each node, where the sum of the second values of the plurality of nodes is equal to the first value. The adjusting, by the power consumption management device, the second power consumption of the server based on a power consumption capping value of the server specifically includes: obtaining, by the power consumption management device, a power consumption capping value of each node, where the sum of the power consumption capping values of the plurality of nodes is the power consumption capping value of the server; and adjusting, by the power consumption management device, the power consumption of each node based on the power consumption capping value of each node.

According to a second aspect, an embodiment provides a power consumption management device. The power consumption management device communicates with a power supply and a server, the power supply supplies power to the server, and the power supply includes a power module; and the power consumption management device includes a power consumption reduction unit and a power consumption capping unit. The power consumption reduction unit is configured to perform the following operations: receiving fault information of the power module, and reducing first power consumption of the server by a first value to obtain second power consumption of the server, where the first power consumption is a power consumption value of the server calculated when the power module works normally, and the first value is not less than a reduced value, calculated when the power module is faulty, of power consumption of the server. The power consumption capping unit is configured to perform the following operation: adjusting the second power consumption of the server based on a power consumption capping value of the server, where the power consumption capping value of the server is a difference between the first power consumption and the reduced value of the power consumption of the server.

With reference to the second aspect, in a first possible implementation of the second aspect, the power consumption reduction unit is further configured to send the fault information to the power consumption capping unit; and that the power consumption capping unit is configured to receive the fault information of the power module specifically includes: receiving the fault information from the power consumption reduction unit.

With reference to the second aspect or the first implementation of the second aspect, in a second possible implementation of the second aspect, the server includes a plurality of nodes, the power consumption reduction unit includes a plurality of power consumption reduction subunits, the power consumption capping unit includes a plurality of power consumption capping subunits, and each power consumption reduction subunit and a power consumption capping subunit communicate with one of the nodes. Each power consumption reduction subunit is configured to perform the following operations: receiving the fault information, obtaining a reduced value of power consumption of each node, and reducing the power consumption of each node by a second value, where the sum of the second values of the plurality of nodes is equal to the first value. Each power consumption capping subunit is configured to perform the following operations: obtaining a power consumption capping value of each node based on the fault information, where the sum of the power consumption capping values of the plurality of nodes is the power consumption capping value of the server; and adjusting the power consumption of each node based on the power consumption capping value of each node.

With reference to the second aspect, in a third possible implementation of the second aspect, the power consumption reduction unit further includes a power consumption reduction management unit, and the power consumption capping unit further includes a power consumption capping management unit. The power consumption reduction management unit is configured to perform the following operations: receiving the fault information, and forwarding the fault information to each power consumption reduction subunit and the power consumption capping management unit; and that each power consumption reduction subunit receives the fault information of the power module specifically includes: receiving the fault information forwarded by the power consumption reduction management unit. The power consumption capping management unit is configured to perform the following operations: receiving the fault information, and forwarding the fault information to each power consumption capping subunit. That each power consumption capping subunit receives the fault information of the power module specifically includes: receiving the fault information forwarded by the power consumption reduction management unit.

According to a third aspect, an embodiment provides a power consumption management device. The power consumption management device communicates with a power supply and a server, the power supply supplies power to the server, and the power supply includes a power module; and the power consumption management device includes an interface and a processor, where the interface communicates with the processor, and the interface is configured to receive fault information of the power module. The processor is configured to perform the following operations: reducing, based on the fault information, first power consumption of the server by a first value to obtain second power consumption of the server, where the first power consumption is a power consumption value of the server calculated when the power module works normally, and the first value is not less than a reduced value, calculated when the power module is faulty, of power consumption of the server; and adjusting the second power consumption of the server based on the fault information and a power consumption capping value of the server, where the power consumption capping value of the server is a difference between the first power consumption and the reduced value of the power consumption of the server.

With reference to the third aspect, in a first possible implementation of the third aspect, the server includes a plurality of nodes. That the processor is configured to reduce first power consumption of a server by a first value to obtain second power consumption of the server specifically includes: obtaining a reduced value of power consumption of each node; and reducing the power consumption of each node by a second value based on the reduced value of the power consumption of each node, where the sum of the second values of the plurality of nodes is equal to the first value. That the power consumption management device adjusts the second power consumption of the server based on the power consumption capping value of the server specifically includes: obtaining a power consumption capping value of each node, where the sum of the power consumption capping values of the plurality of nodes is the power consumption capping value of the server; and adjusting the power consumption of each node based on the power consumption capping value of each node.

According to a fourth aspect, an embodiment provides a power consumption management device. A non-volatile readable storage medium includes a first computer instruction used to receive fault information of a power module, and reduce first power consumption of a server by a first value to obtain second power consumption of the server, where the server is powered by a power supply, the power supply includes the power module, and the power consumption management device communicates with the power supply and the server; and the first power consumption is a power consumption value of the server calculated when the power module works normally, and the first value is not less than a reduced value, calculated when the power module is faulty, of power consumption of the server. The non-volatile readable storage medium further includes a second instruction used to adjust the second power consumption of the server based on a power consumption capping value of the server, where the power consumption capping value of the server is a difference between the first power consumption and the reduced value of the power consumption of the server.

With reference to the fourth aspect, in a first possible implementation of the fourth aspect, the server includes a plurality of nodes. That a first instruction is used to reduce first power consumption of a server by a first value to obtain second power consumption of the server specifically includes: obtaining a reduced value of power consumption of each node; and reducing the power consumption of each node by a second value based on the reduced value of the power consumption of each node, where the sum of the second values of the plurality of nodes is equal to the first value. That a second instruction is used to adjust the second power consumption of the server based on a power consumption capping value of the server specifically includes: obtaining a power consumption capping value of each node, where the sum of the power consumption capping values of the plurality of nodes is the power consumption capping value of the server; and adjusting the power consumption of each node based on the power consumption capping value of each node.

DESCRIPTION OF EMBODIMENTS

Figure 1A:
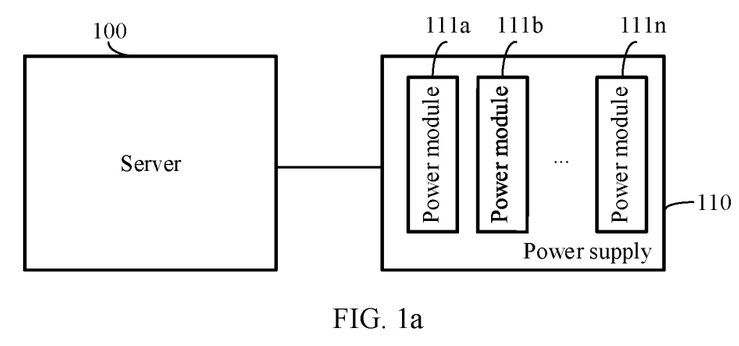
FIG. 1a is a schematic diagram of a single-node server equipped with a power supply.
Figure 1B:
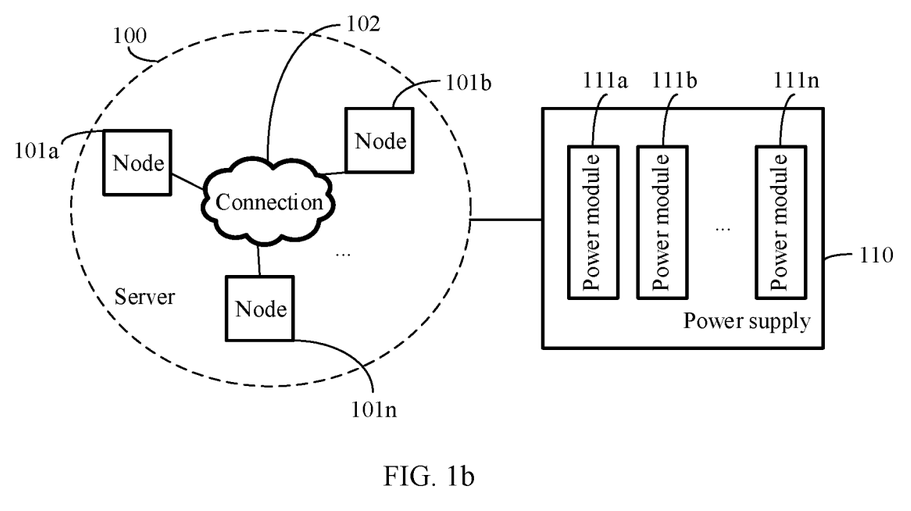
FIG. 1b is a schematic diagram of a multi-node server equipped with a power supply.

In FIG. 1a, a server 100 is connected to a power supply 110, and the power supply 110 includes a power module 111a, a power module 111b, ..., and a power module 111n. In FIG. 1b, a server 100 is a server including a plurality of nodes, and the server 100 includes a node 101a, a node 101b, ..., and a node 101n that are connected to each other, and a power supply 110 includes a power module 111a, a power module 111b, ..., and a power module 111n. A connection 102 represents an example connection relationship between the nodes 101.

Figure 2:
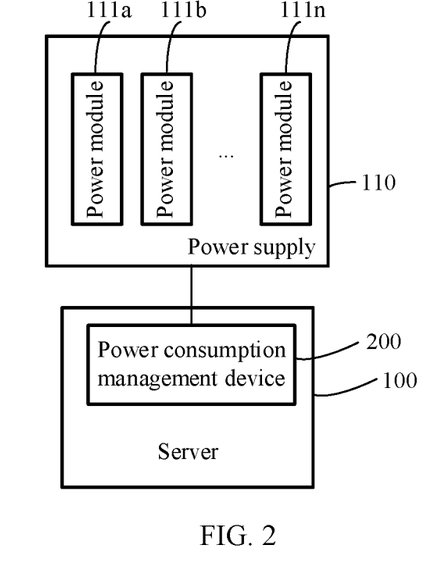
FIG. 2 is a schematic diagram of a power supply management module and a power supply in a server.
Figure 3:
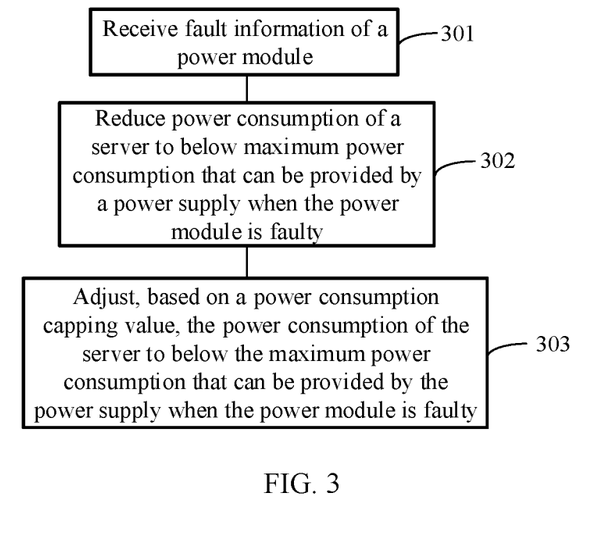
FIG. 3 is a schematic diagram of performing steps by a power consumption management device in a single-node server.

An embodiment provides a power consumption management device 200 of a server 100. FIG. 2 is a schematic diagram of a relationship between the power consumption management device 200 and a power supply 110 of the server 100. When the server 100 is a single-node server, the power consumption management device 200 in the server 100 communicates with each power module 111, and receives fault information of each power module 111. In this embodiment, the fault information may be an interrupt signal or a signal in another form, and this is not limited in this embodiment. The power consumption management device 200 stores a reduced value, calculated when a power module 111 is faulty, of power consumption of the server 100. As shown in FIG. 3, specific steps performed by the power consumption management device 200 are as follows.

301. Receive the fault information of the power module 111.

302. Reduce first power consumption of the server 100 by a first value to obtain second power consumption of the server 100, where the first power consumption is a power consumption value of the server 100 when the power module 111 works normally, and the first value is not less than the reduced value of the power consumption of the server 100 when the power module 111 is faulty.

A specific implementation of reducing the power consumption of the server 100 by the first value includes but is not limited to pulling down Prochot and Memhot pins of a CPU, turning off a component such as a clock, temporarily powering off a fan, triggering a low load or a hibernate mode of a component, or the like. In step 301, after the power module 111 is faulty, the power consumption management device reduces the power consumption of the server 100 by the first value within a holding time to below maximum power consumption that can be provided by the power supply 110 after the power module 111 is faulty. This ensures that the server 100 does not break down.

303. Adjust the second power consumption of the server 100 based on a power consumption capping value of the server 100, where the power consumption capping value of the server 100 is a difference between the first power consumption and the reduced value of the power consumption of the server 100 when the power module 111 is faulty.

In step 303, a specific implementation of adjusting the power consumption of the server 100 is mainly adjusting a running state of a high-power component, including but not limited to CPU frequency and voltage adjustment, CPU core enabling and disabling, a CPU P/T-state, a memory frequency, a T state of a memory, reading, writing, and hibernation states of a hard disk, an L0/L1 pin state of a high-speed peripheral component interconnect express (PCIe) network adapter, a working status of a graphics processing unit (GPU), a fan speed, and other manners in which the power consumption of the server 100 can be controlled precisely.

A power consumption capping technology is a specific implementation of step 303. The power consumption management device 200 periodically detects the power consumption of the server 100, and calculates a difference between the power consumption of the server 100 and the power consumption capping value of the server 100. When the difference is greater than a preset error value, a power control device 200 adjusts the power consumption of the server 100, continues to detect the power consumption, and calculates the difference until the difference falls within a preset error range. The power consumption capping technology can precisely adjust the power consumption of the server 100, so that the power consumption of the server 100 approximates to, based on a preset error, the maximum power consumption that can be provided by the power supply 110 when the power module 111 is faulty.

Generally, in step 302, methods used for reducing the power consumption of the server 100 cannot precisely reduce the power consumption of the server 100 to the maximum power consumption that can be provided by the power supply 110 after the power module is faulty. Therefore, the power consumption management device 200 needs to perform step 303, to adjust the power consumption of the server 200 to approximate to the maximum power consumption that can be provided by the power supply 110 after the power module is faulty. This improves utilization of the power module 111 that normally works. Step 302 and step 303 are combined. This avoids a breakdown of the server 100, and further improves the utilization of the power supply 110 after the power module 111 is faulty.

Figure 4:
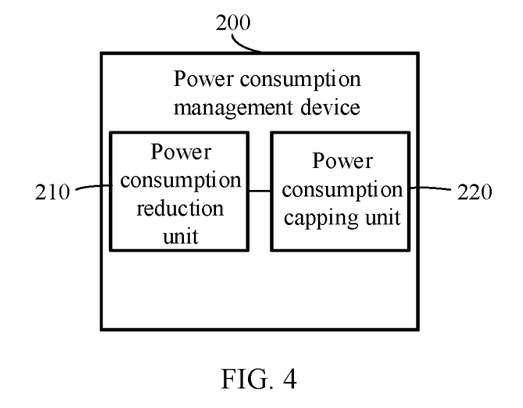
FIG. 4 is a schematic structural diagram of a power consumption management device in a single-node server.

As shown in FIG. 4, a structure of the power consumption management device 200 of the single-node server in FIG. 2 includes a power consumption reduction unit 210 and a power consumption capping unit 220. The power consumption reduction unit 210 is configured to: receive the fault information of the power module 111, perform step 301, and forward the fault information to the power consumption capping unit 220. The power consumption capping unit 220 is configured to receive the fault information forwarded by the power consumption reduction unit 210, and perform step 302 to implement power consumption and power supply management of the server 100.

Specifically, the power consumption reduction unit 210 is implemented by a complex programmable logic device (CPLD), a baseboard management controller (BMC), and another power supply control unit that can reduce the power consumption of the server within a holding time after the power module 111 is faulty. This is not limited in this embodiment.

The power consumption capping unit 220 is implemented by using the BMC, Intel Node Manager, and a combination of the BMC and a basic input/output system (BIOS).

In addition, the power consumption reduction unit 210 and the power consumption capping unit 220 may be integrated into a chip or another hardware device, or may be independent electronic components coupled in an electrical, mechanical, or other form, or two or more units are integrated into one unit. This is not limited in this embodiment.

Figure 5:
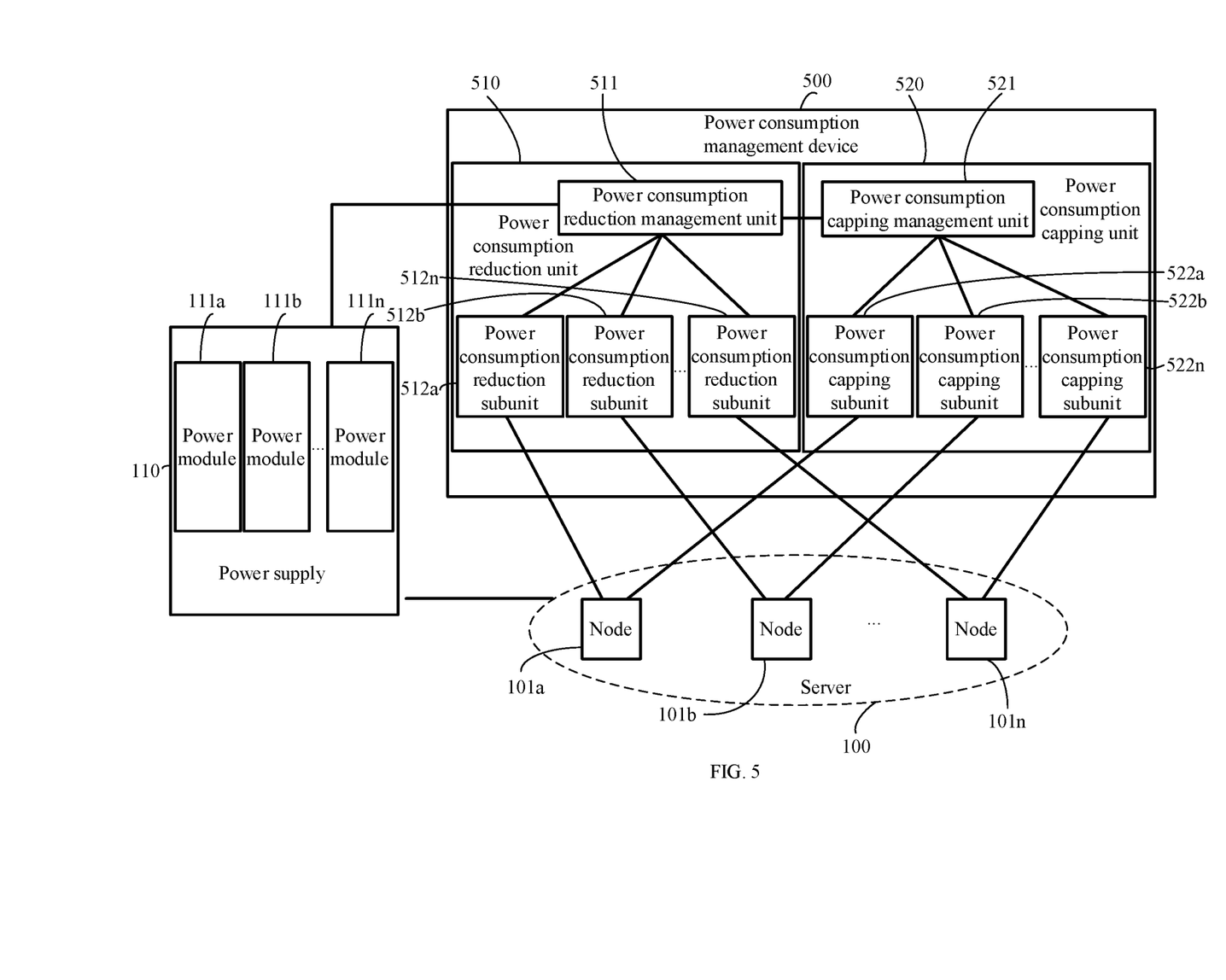
FIG. 5 is a schematic diagram of an architecture of a power consumption management device, a server, and a power supply in a multi-node server.

The server 100 in this embodiment may be a multi-node server. FIG. 5 shows a connection relationship between a power consumption management device 500, a multi-node server 100, and a power supply 110. Same as that in FIG. 1b, the server 100 includes the node 101a, the node 101b, . . . , and the node 101n. The power supply 110 supplies power to the server 100, and the connection 102 is omitted in FIG. 5. The power consumption management device 500 includes a power consumption reduction unit 510 and a power consumption capping unit 520. The power consumption reduction unit 510 includes a power consumption reduction management unit 511, a power consumption reduction subunit 512a, a power consumption reduction subunit 512b, . . . , and a power consumption reduction subunit 512n. The power consumption capping unit 520 includes a power consumption capping management unit 521, a power consumption capping subunit 522a, a power consumption capping subunit 522b, . . . , and a power consumption capping subunit 522n. The power consumption reduction subunit 512b, . . . , and the power consumption reduction subunit 512n respectively communicate with the node 101a, the node 101b, . . . , and the node 101n. The power consumption capping subunit 522a, the power consumption capping subunit 522b, . . . , and the power consumption capping subunit 522n also respectively communicate with the node 101a, the node 101b, . . . , and the node 101. The power consumption capping management unit 521 manages all power consumption capping subunits 522, and the power consumption reduction management unit 511 manages all power consumption reduction subunits 522. In addition, the power consumption reduction management unit 511 communicates with the power supply 110. The power consumption reduction management unit 511 and the power consumption capping management unit 521 store a reduced value of the power consumption of the server 100 when a power module 111 is faulty.

In the architecture shown in FIG. 5, specific steps performed by the power consumption management device 500 are as follows.

601. Receive the fault information of the power module 111.

The fault information may be an interrupt signal or a signal in another form, and this is not limited in this embodiment.

602. Obtain reduced values of power consumption of the node 101a, the node 101b, . . . , and the node 101n.

603. Reduce power consumption of each node by a second value based on reduced values of the power consumption of the node 101a, the node 101b, . . . , and the node 101n, so that within a holding time of the faulty power module 111, total power consumption of all nodes, namely, power consumption of the server 100, is reduced to below maximum power consumption that can be provided by the power supply 110 after the power module 111 is faulty. This ensures that the server 100 does not break down.

A specific implementation of reducing the power consumption of the server 100 includes but is not limited to pulling down Prochot and Memhot pins of a CPU, turning off a component such as a clock, temporarily powering off a fan, triggering a low load or a hibernate mode of a component, or the like. As described above, the implementation of rapidly reducing the power consumption cannot precisely control the power consumption of each node. As a result, low utilization of the power supply 110 is caused. In this case, the power consumption management device 500 performs step 604.

604. The power consumption management device 500 obtains power consumption capping values of each node based on the fault information, where the sum of the power consumption capping values of the plurality of nodes is a power consumption capping value of the server 100.

605. Adjust the power consumption of each node based on the power consumption capping values of each node, so that the power consumption of the server 100 approximates to, based on a preset error, the maximum power consumption that can be provided by the power supply 110 when the power module 111 is faulty.

An initial capping value for a power consumption capping operation on each node is a difference between a power consumption value of the node when the power module 111 works normally, and a reduced value of the power consumption of the node when the power module 111 is faulty.

A specific implementation of step 605 is mainly adjusting a running state of a high-power component, including but not limited to CPU frequency and voltage adjustment, CPU core enabling and disabling, a CPU P/T-state, a memory frequency, a T state of a memory, reading, writing, and hibernation states of a hard disk, an L0/L1 pin state of a high-speed peripheral component interconnect express (PCIe) network adapter, a working status of a graphics processing unit (GPU), a fan speed, and other manners in which the power consumption of the server 100 can be controlled precisely.

The power consumption capping technology in step 605 in a specific implementation includes the following steps: A power control device 200 periodically detects the power consumption of the server 100, and calculates a difference between the power consumption of the server 100 and the power consumption capping value of the server 100. When the difference is greater than a preset error value, the power control device 200 adjusts the power consumption of the server 100, continues to detect the power consumption, and calculates the difference until the difference falls within a preset error range. The power consumption capping technology can precisely adjust the power consumption of the server 100, so that the power consumption of the server 100 approximates to, based on a preset error, the maximum power consumption that can be provided by the power supply 110 when the power module 111 is faulty.

Performing step 604 and step 605 avoids a breakdown of the server 100 when power is off, and further improves utilization of the power supply 110 after the power module 111 is faulty.

Figure 6:
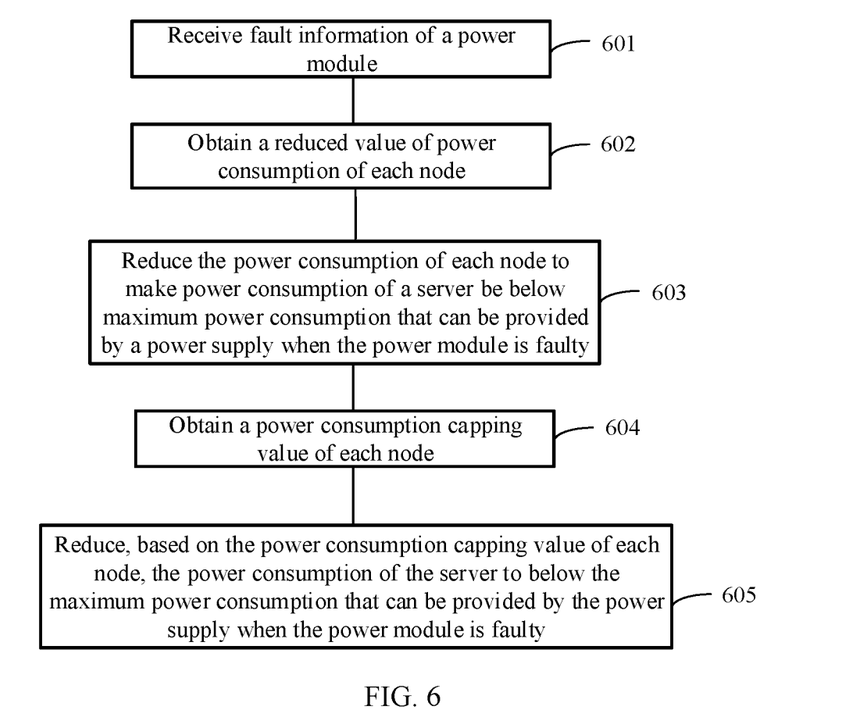
FIG. 6 is a schematic diagram of performing steps by a power consumption management device in a multi-node server.

FIG. 6 shows an internal structure of the power consumption management device 500 in this method, and a specific structure is described above. The power consumption reduction management unit 511 is configured to receive the fault information of the power module 111, and forward the fault information to each power consumption reduction subunit 512. Each power consumption reduction subunit 512 performs step 602 and step 603 to rapidly reduce the power consumption of the server 100 within the holding time of the faulty power module 111. This ensures running of the nodes 512, namely, the server 100.

The power consumption reduction management unit 511 is further configured to forward the fault information to the power consumption capping management unit 521. The power consumption capping management unit 521 is configured to receive fault information of the power consumption reduction management unit 511, and forward the fault information to each power consumption capping subunit 522. Each power consumption capping subunit 522 performs step 604 and step 605 to adjust, within the preset error range, the power consumption of each node 101 to the maximum power consumption that can be provided by the power supply 110 when the power module 111 is faulty.

Similarly, constituent parts of the power consumption management device 500 may be integrated into a chip or another hardware device, or may be independent electronic components coupled in an electrical, mechanical, or other form, or two or more units may be integrated into one unit. This is not limited in this embodiment.

Figure 7:
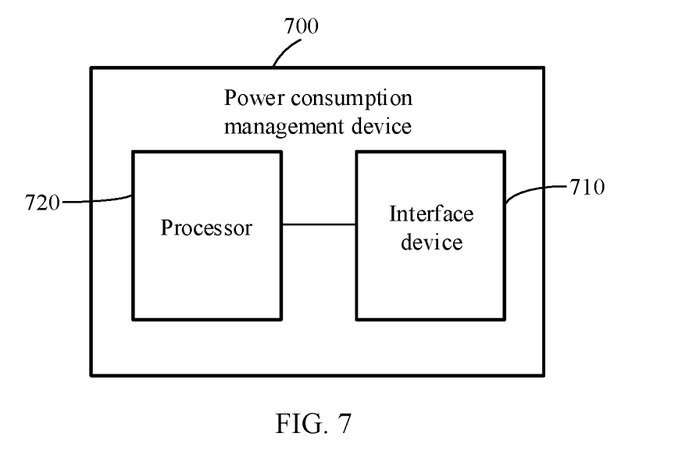
FIG. 7 is a schematic diagram of a power consumption management device.

An embodiment further provides a power consumption management device 700, as shown in FIG. 7. The power consumption management device 700 includes an interface device 710 and a processor 720. The processor 720 may include a CPU and a memory. There may be one or more CPUs. The processor 720 may further be a field programmable gate array (FPGA), a combination of an FPGA and the CPU, or a combination of the CPU and a BIOS. This is not limited in this embodiment of the present application. The interface device 710 is configured to receive the fault information of the power module 111. When a server 100 is a single-node server, the processor 720 is configured to perform step 302 and step 303. When the server 100 is a multi-node server, the processor 720 is configured to perform step 602 to step 605.

An embodiment further provides a non-volatile readable storage medium. When a server 100 is a single-node server, the readable storage medium includes a first instruction used to perform step 301 and step 302 and a second instruction used to perform step 303. When the server 100 is a multi-node server, the readable storage medium includes a first instruction used to perform step 603 to step 603 and a second instruction used to perform step 604 and step 605.

In the several embodiments provided in the present application, it should be understood that the disclosed apparatuses and methods may be implemented in other manners. For example, division of the unit in the described apparatus embodiment is merely logical function division, or may be other division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in an electrical manner, a mechanical manner, or another manner.

What is claimed is:

1. A power consumption management method, comprising:

receiving, by a power consumption management device, fault information of a power module, wherein the power consumption management device communicates with a server, and a power supply that supplies power to the server comprises the power module;

reducing, by the power consumption management device, first power consumption of the server by a first value to obtain second power consumption of the server, wherein the first power consumption is a power consumption value of the server determined during a period in which the power module works normally, and the first value is not less than a reduced value of power consumption of the server, and the reduced value is determined during a period in which the power module is faulty;

adjusting, by the power consumption management device, the second power consumption of the server based on a power consumption capping value of the server, wherein the power consumption capping value of the server is a difference between the first power consumption and the reduced value of the power consumption of the server, wherein reducing the power consumption of the server includes pulling down Prochot and Memhot pins of a CPU; and in response to a difference between the power consumption capping value of the server and the power consumption of the server being greater than a preset error value, continuously adjust the power consumption of the server, until the difference falls within a preset error range, so as to adjust the power consumption of the server to approximate to a maximum power consumption provided by the power supply upon the power module being faulty.

2. The method according to claim 1, wherein the server comprises a plurality of nodes, wherein the reducing the first power consumption of the server comprises:

obtaining, by the power consumption management device, a reduced value of power consumption of each node; and reducing, by the power consumption management device, the power consumption of each node by a second value based on the reduced value of the power consumption of each node, wherein a sum of second values of the plurality of nodes is equal to the first value.

3. The method according to claim 2, wherein the adjusting the second power consumption of the server comprises:

obtaining, by the power consumption management device, a power consumption capping value of each node, wherein the sum of the power consumption capping values of the plurality of nodes is the power consumption capping value of the server; and adjusting, by the power consumption management device, the power consumption of each node based on the power consumption capping value of each node.

4. A power consumption management device, comprising:
a processor, and a memory, storing processor-executable instructions which are executed by the processor and cause the device to perform operations including:
- receiving fault information of a power module, wherein the power consumption management device communicates with a server, and a power supply that supplies power to the server comprises the power module;
- reducing, based on the fault information, first power consumption of the server by a first value to obtain second power consumption of the server, wherein the first power consumption is a power consumption value of the server determined during a period in which the power module works normally, and the first value is not less than a reduced value of power consumption of the server, and the reduced value is determined during a period in which the power module is faulty;
- adjusting the second power consumption of the server based on the fault information and a power consumption capping value of the server, wherein the power consumption capping value of the server is a difference between the first power consumption and the reduced value of the power consumption of the server,
- wherein reducing the power consumption of the server includes pulling down Prochot and Memhot pins of a CPU; and
- in response to a difference between the power consumption capping value of the server and the power consumption of the server being greater than a preset error value, continuously adjusting the power consumption of the server, until the difference falls within a preset error range, so as to adjust the power consumption of the server to approximate to a maximum power consumption provided by the power supply upon the power module being faulty.

5. The power consumption management device according to claim 4, wherein the server comprises a plurality of nodes, wherein the processor is configured to:
- obtain a reduced value of power consumption of each node; and
- reduce the power consumption of each node by a second value based on the reduced value of the power consumption of each node, wherein a sum of the second values of the plurality of nodes is equal to the first value.

6. The power consumption management device according to claim 5, wherein the processor is configured to:
- obtain a power consumption capping value of each node, wherein the sum of the power consumption capping values of the plurality of nodes is the power consumption capping value of the server; and
- adjust the power consumption of each node based on the power consumption capping value of each node.

7. A non-transitory computer-readable storage medium, storing processor-executable instructions to be executed by a processor of a power consumption management device, wherein the instructions comprise:
- instruction for receiving fault information of a power module;
- instruction for reducing first power consumption of a server by a first value to obtain second power consumption of the server, wherein the server is powered by a power supply, the power supply comprises the power module, and the power consumption management device communicates with the server; and the first power consumption is a power consumption value of the server determined during a period in which the power module works normally, and the first value is not less than a reduced value of power consumption of the server, and the reduced value is determined during a period in which the power module is faulty;
- instruction for adjusting the second power consumption of the server based on a power consumption capping value of the server, wherein the power consumption capping value of the server is a difference between the first power consumption and the reduced value of the power consumption of the server,
- wherein reducing the power consumption of the server includes pulling down Prochot and Memhot pins of a CPU; and
- in response to a difference between the power consumption capping value of the server and the power consumption of the server being greater than a preset error value, instruction for continuously adjusting the power consumption of the server, until the difference falls within a preset error range, so as to adjust the power consumption of the server to approximate to a maximum power consumption provided by the power supply upon the power module being faulty.

8. The non-transitory computer-readable storage medium according to claim 7, wherein the server comprises a plurality of nodes, wherein the instructions comprises:
- instruction for obtaining a reduced value of power consumption of each node; and
- instruction for reducing the power consumption of each node by a second value based on the reduced value of the power consumption of each node, wherein a sum of the second values of the plurality of nodes is equal to the first value.

9. The non-transitory computer-readable storage medium according to claim 8, wherein the instructions comprise:
- instruction for obtaining a power consumption capping value of each node, wherein the sum of the power consumption capping values of the plurality of nodes is the power consumption capping value of the server; and
- instruction for adjusting the power consumption of each node based on the power consumption capping value of each node.

* * * * *

UNITED STATES PATENT AND TRADEMARK OFFICE
CERTIFICATE OF CORRECTION

| | |
|---|---|
| PATENT NO. | : 11,385,985 B2 |
| APPLICATION NO. | : 16/818765 |
| DATED | : July 12, 2022 |
| INVENTOR(S) | : Wang et al. |

It is certified that error appears in the above-identified patent and that said Letters Patent is hereby corrected as shown below:

On the Title Page (74): "Attorney, Agent, or Firm - Levdig, Voit & Mayer, Ltd." should read -- Attorney, Agent, or Firm - Leydig, Voit & Mayer, Ltd. --.

In the Claims

Claim 8: Column 12, Line 36: "rality of nodes, wherein the instructions comprises:" should read -- rality of nodes, wherein the instructions comprise: --.

Signed and Sealed this
Twenty-second Day of November, 2022

*Katherine Kelly Vidal*

Katherine Kelly Vidal
*Director of the United States Patent and Trademark Office*